United States Patent
Niwa et al.

(10) Patent No.: US 6,464,906 B1
(45) Date of Patent: Oct. 15, 2002

(54) METHOD OF MANUFACTURING SPHERICAL BODIES BY ROTATION, SPHERICAL BODIES MADE BY THE METHOD AND A POWDER COMPOSITION FOR USE IN THE METHOD

(75) Inventors: Tomonori Niwa; Tetsuji Yogo, both of Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/417,208

(22) Filed: Oct. 13, 1999

(30) Foreign Application Priority Data

Oct. 13, 1998 (JP) ............................. 10-290798

(51) Int. Cl.⁷ ................................. B29B 9/00
(52) U.S. Cl. ...................... 264/7; 264/5; 264/8; 264/9; 264/15; 264/678; 264/683
(58) Field of Search ................. 264/5, 7, 8, 9, 264/15, 683, 678

(56) References Cited

U.S. PATENT DOCUMENTS

| | | | |
|---|---|---|---|
| 3,900,317 A | * | 8/1975 | Meadus |
| 4,725,390 A | * | 2/1988 | Laid ............... 264/15 |
| 4,917,857 A | | 4/1990 | Jaeckel et al. |
| 5,643,843 A | | 7/1997 | Dunmead et al. |
| 5,665,279 A | * | 9/1997 | Plovnick ............ 264/5 |

FOREIGN PATENT DOCUMENTS

| | | |
|---|---|---|
| DE | 300 288 A | 6/1992 |
| DE | DD 300 288 A | 6/1992 |
| EP | 0 300 543 A | 1/1989 |

OTHER PUBLICATIONS

Adler, J. et al., *cfi (ceramic forum international)/Ber.* DKG 69 (1992) No. 3, "Selection, manufacture and application of pressureless–sintered silicon carbide and silicon nitride grinding balls," pp. 90–96.

* cited by examiner

Primary Examiner—James Derrington
(74) Attorney, Agent, or Firm—Sughrue Mion, PLLC

(57) ABSTRACT

A method of making spherical bodies from powder, which comprises (1) preparing an adjusted powder so as to have at least one powder characteristic selected from the group consisting of an average particle size, a powder particle size distribution and a BET specific surface area, (2) preparing nuclei having a particle size larger than that of the adjusted powder, (3) rotating the nuclei, and (4) adding the adjusted powder and a solvent to the rotating nuclei so that particles of the adjusted powder accumulate on the nuclei to form granular bodies. Also disclosed is a spherical body having a core or nucleus formed in the spherical body, an adjusted powder composition for forming a spherical body, and a method for manufacturing spherical sintered bodies of silicon nitride.

21 Claims, 13 Drawing Sheets

Powder Particle

FIG. 9 (a)
FIG. 9 (b)
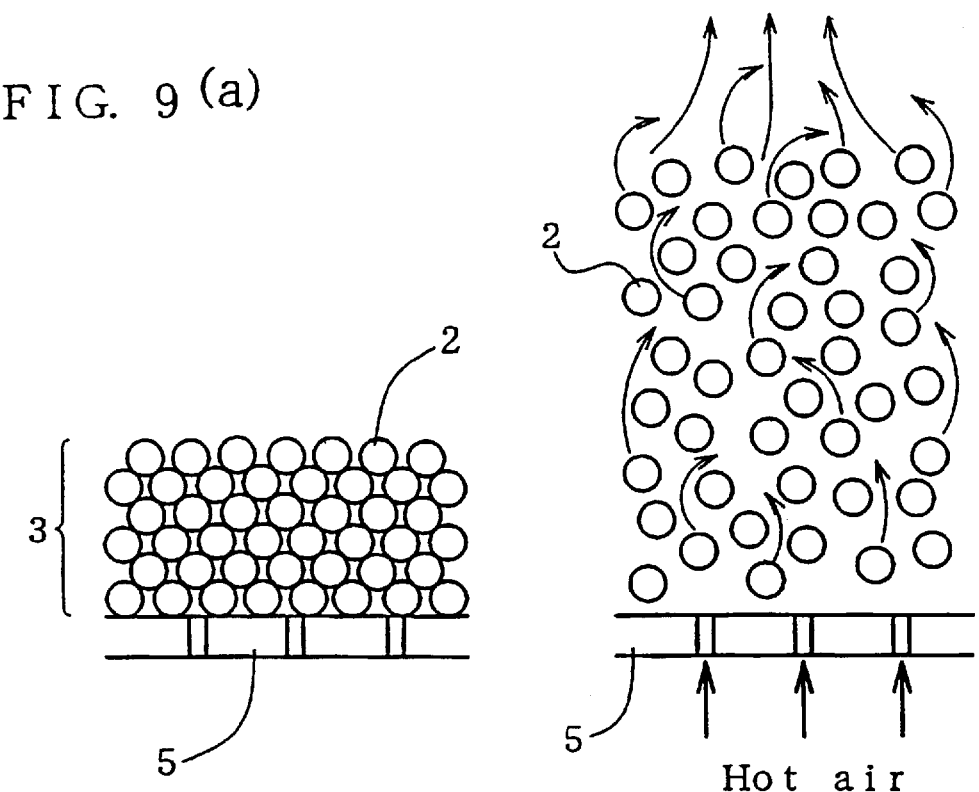
Hot air
FIG. 10
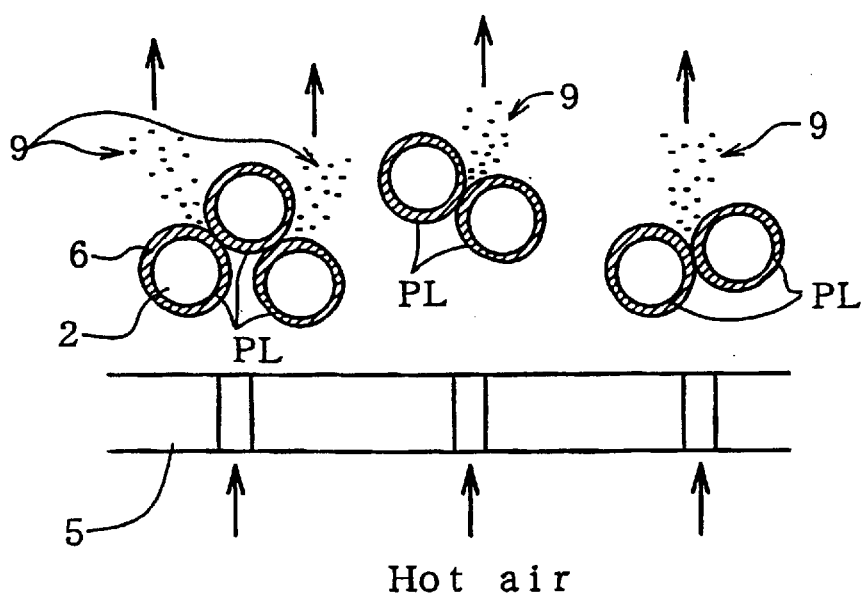
Hot air

Relative cumulative frequency $N_{rc}$ = $\dfrac{N_c}{N_o} \times 100$ (%)

90% particle size : particle size value when $N_{rc}$ becomes 90%

50% particle size : particle size value when $N_{rc}$ becomes 50%

METHOD OF MANUFACTURING SPHERICAL BODIES BY ROTATION, SPHERICAL BODIES MADE BY THE METHOD AND A POWDER COMPOSITION FOR USE IN THE METHOD

FIELD OF THE INVENTION

The present invention relates to a method of making balls or spherical bodies of high density from powder by way of rotation, and particularly to a method for making or rather manufacturing small spherical bodies made of inorganic material such as silicon nitride ceramic balls in a low cost mass-production by way of rotation. This invention also relates to spherical bodies of high density and particularly to ceramic balls for use in various ball-using applications, made by the method of the invention. This invention further relates to an adjusted powder composition that is suitably used for the method of the present invention to make the spherical bodies.

BACKGROUND OF THE INVENTION

Ceramic balls (or spherical ceramic bodies), particularly silicon nitride ceramic balls, can be incorporated into bearings requiring high duty, high durability, high speed and/or high precision. This is because ceramic balls are advantageous in improving the performance of a bearing in view of their hardness and light weight, as compared with metal balls. On the other hand, because ceramic balls for use as bearings are expensive, they have not yet been widely used nor popularly accepted across the total industry employing a very large number of high-performance balls.

One reason for the expense of the ceramic balls is that a low-cost method for forming ball-shaped or spherical sintered bodies having a high density from a ceramic powder has not yet been established, which requires a performance at least similar to or comparable with the metal balls for bearings.

Conventionally, a molding method has been employed for manufacturing relatively uniform and less defective spherical ceramic bodies so long as their diameter is relatively large. However, due to its low molding efficiency, this conventional molding process is not suited for inexpensively manufacturing a large number of small balls, for example, those for use in most bearings. For example, computer hard disk drive motors or other spindling devices require a large number of small bearing balls having a diameter of, e.g., 2 mm or the like, mostly less than 4.5 mm.

A die-pressing method using press punches requires two hemispheric cavities formed in their end faces. Such a die-pressing method unavoidably causes the formation of an unnecessary circular flange or brim portion around a press-formed spherical body due to unilateral movement of the punches, and tends to form a low density unfired spherical ball that possibly leaves pores or areas of non-uniform density inside the ball after sintering. The unnecessary portion has to be removed before firing an unfired ball or before polishing the fired body, adding more cost and inefficiency in manufacturing the ceramic balls.

Other known methods or processes for manufacturing spherical bodies from powder include a tumbling granulation process, a stirring granulation process and a squeezing granulation process. These processes require a material powder having large agglomerates ranging from 50–200 $\mu$m with a high powder fluidity, normally made by spray-drying a slurry containing inorganic powder. On the other hand, a high performance ball bearing requires balls of fine surface. Namely, a fine ceramic powder having small agglomerates with a low fluidity is desirably employed for making ceramic bearing balls with uniform density and without defects such as discontinuous boundaries, holes and pores inside or on the ball surface, which increases reliability of the bearings.

The spray-dried powder material having such a large agglomerate size of from 50–200 $\mu$m, which tends to induce non-uniform shrinkage, deformation, cracks or chipping during or after sintering unfired ceramic bodies, has been used in manufacturing relatively large-sized balls such as ball-media, e.g., for use in a cement-powdering process that does not require the high reliability or durability.

SUMMARY OF THE PRESENT INVENTION

It is therefore an object of the present invention to provide a low-cost method for making spherical bodies from a powder, suitable for mass-production of spherical bodies. One of the features of the method of the present invention is directed to the use of a nucleus which forms and grows a granular body around the nucleus by rotating the nucleus. Another feature of the present method is directed to the use of an adjusted powder suitably adjusted for forming and growing a granular body having the nucleus inside the body during the rotation.

Specifically, the method of making spherical bodies from powder according to one aspect of the invention, comprises:
  (1) preparing an adjusted powder having at least one powder characteristic selected from the group consisting of an average particle size, a powder particle size distribution and a BET specific surface area;
  (2) preparing nuclei having a particle size larger than that of the adjusted powder;
  (3) rotating the nuclei; and
  (4) adding the adjusted powder and a solvent to the rotating nuclei so that particles of the adjusted powder accumulate on the nuclei to form granular bodies. Preferably, each granular body has the nuclei therein. The rotation of the nuclei may include a meaning of rolling. or tumbling the nuclei, i.e., rotation of the nuclei with some vibration added to the nuclei.

An advantage of the method of the present invention is that a large quantity of spherical inorganic bodies (e.g., bearing balls) of ceramic such as nitrides including silicon nitride, aluminum nitride or boron nitride, oxides including zirconia or alumina, carbides including tungsten carbide or titanium carbide, and the like, are inexpensively and efficiently manufactured.

Preparing the adjusted powder in the above method can advantageously comprise mixing at least an inorganic powder and a sintering aid powder uniformly to form a powder mixture having powder characteristics comprising an average particle size of 0.1–2 $\mu$m, a 90% powder particle size distribution falling within a range of from 0.7–3.5 $\mu$m, and a BET specific surface area of from 5–20 m$^2$/g.

An advantage of this additional step is that a large quantity production of spherical green bodies, namely, spherical unfired balls, is facilitated. Another advantage is that the spherical bodies unfired or sintered have a high uniform density and are produced uniformly with less defects in a large quantity by virtue of using the adjusted powder in the method according to the invention.

An alternative of the above for preparing the adjusted powder comprises steps of
  (1) forming a slurry by uniformly mixing at least a ceramic powder, a sintering aid powder and a solvent;

(2) drying the slurry into agglomerates; and (3) pulverizing the agglomerates into a fine powder having an average particle size of 0.1–2 $\mu$m, a 90% powder particle size distribution falling within a range of from 0.7–3.54 $\mu$m determined according to a cumulative relative frequency distribution of powder particle sizes, and a BET specific surface area of 5–20 m$^2$/g.

The advantage of these steps is directed to the slurry. This is because the slurry forms a uniform distribution of the ceramic powder and sintering aid powder mixed in the slurry and further forms aggregates comprised of the ceramic powder particles uniformly distributed with the sintering aid powder particles.

Various kinds of solvents may be used as long as pulverization of the aggregates can be accomplished. Water is recommended for the solvent, because water does not cause an environmental issue.

The method of making spherical bodies by rotation or tumbling according to the invention may further comprise:

(1) firing spherical granular bodies to thereby produce sintered spherical bodies; and (2) grinding surfaces of the sintered spherical bodies to produce polished spherical bodies. This is because spherical bodies generally need a certain hardness and a surface smoothness in actual use.

In one aspect of the embodiments according to the invention, a method is provided for manufacturing spherical sintered ceramic bodies from ceramic powder of silicon nitride. The method comprises preparing an adjusted powder which predominantly comprises silicon nitride powder and a suitable amount of a sintering aid powder, wherein the adjusted material powder has at least, an average particle size of 0.1–2 $\mu$m, more preferably 0.3–2 $\mu$m, and a 90% cumulative relative frequency in powder particle size distribution of from 0.7–3.5 $\mu$m, both as preferably measured using a laser diffraction granulometer, as well as a BET specific surface area of from 5–20 m$^2$/g, more preferably from 5–13 m$^2$/g; forming the adjusted powder into spherical green bodies by rotating nuclei adhering the adjusted powder; and sintering the spherical green bodies to obtain spherical sintered bodies of silicon nitride.

Herein, the 90% powder particle size distribution is the particle size value when Nrc (i.e., relative cumulative frequency) becomes 90% as understood by reference to FIG. 12(b), or to the particle size value when a Nrc value of 90% is attained or when the number Nc (i.e., cumulative frequency of particle size classes counted from the smallest particle size class) is divided by No (i.e., total frequency counted from the smallest particle size to the maximum particle size) as may be more clearly understood by referring to FIG. 12(a).

The average particle size can be expressed as a 50% particle size herein and defined as the Nrc value of 50% of that attained in a manner similar to the above, i.e., the average particle size means the particle size value when Nrc=50%.

Another object of the invention is to provide an adjusted powder suitably adjusted in use for the method of the invention, namely, making spherical balls in mass-production.

A feature of the adjusted powder is directed to adjustment of an original powder material. Namely, the adjusted powder adjusted from the original powder material has at least one of three powder characteristics including an average powder particle size, a relative cumulative frequency of powder particle size distribution and a BET specific surface area of the powder. An advantage of using the adjusted powder is that it facilitates adhering powder particles around the nucleus to form a spherical granular body and further adhering the powder particles to the granular body to grow the granular body further in size during rotation of the nucleus, with addition of a solvent such as water to the nucleus in rotation.

In one aspect of the invention, the best result of making spherical bodies is attained by use of an adjusted powder having all the above powder characteristics of an average powder particle size, relative cumulative frequency and BET specific surface area, in the method of the present invention.

These powder characteristics are important factors in forming the spherical granular body by rotation or tumbling according to the invention. Specifically, when the average power particle size, relative cumulative frequency of powder sizes and BET specific surface area are in the range of 0.1–2 $\mu$m, 0.7–3.5 $\mu$m at a 90% relative cumulative frequency, and 5–20 m$^2$/g, respectively, a good result is attained in forming unfired spherical granular bodies and spherical sintered bodies made by the method according to the invention.

The average powder particle size and/or relative cumulative frequency of powder size distribution of the adjusted powder are determined by a laser granulometer, and the BET specific surface area of the adjusted powder is determined by a Brunauer-Emmett-Teller method.

Still Another object of the invention is to provide a spherical ball unfired or sintered, which is made from the adjusted powder by any of the methods according to the invention.

In one aspect, a spherical ball made according to the method of the invention have a high relative density. This is because the adjusted powder uniformly and firmly adheres around the rotating nucleus and around the rotationally growing granular body having the nucleus in the center due to a radial directional force being applied to the nucleus as well as the granular body by rotation.

The relative density of the spherical body in a unfired state becomes no less than 61% and as high as 75%, rendering more than 98% or rather very close to a 100% relative density to the resultant spherical sintered body when the unfired spherical granular body is subjected under a HIP (hot isostatic pressing) or a GP (gas pressure) sintering condition, in the case of, e.g., a ceramic spherical body, particularly a silicon nitride ceramic spherical body.

In one aspect, the density of the spherical body becomes high and uniform in a circular direction inside the spherical body made by the method of the invention as well as in a radial direction. This is because fine particles of the adjusted powder are forced into gaps among the particles adhered onto the granular body surface by a force in the radial direction of the spherical granular body.

A layer of the adjusted powder adhered on the granular body surface is formed and packed uniformly in the circular direction as well as in the radial direction during rotation of the granular body that has the nucleus therein.

This circular uniformity in addition to the radial uniformity of the density of the spherical body is advantageously important because the spherical body unfired or fired is protected from the formation of interior defects such as pores and holes. The resultant sintered spherical body is protected from cracking in a radial direction when it is actually used in an application such as a bearing. If there is such a defect inside or particularly close to or on the ball surface, high reliability and/or high performance of the bearing are not attained. This is because the ball in actual use for the bearing receives a high load in the radial direction possibly causing breakage or cracking leading to a failure.

A feature of the spherical bodies (or balls) according to the invention is as follows. A lightness and/or a chromaticity observed on an inside surface that is made by cutting the spherical ball across the ball center into hemispherical halves and polishing the inside surface of the half vary less in the circular direction but vary more in the radial direction of the spherical body between the center and the surface. The lightness and chromaticity are clearly identified as circular stripes in the case of unfired green spherical bodies. The variation in lightness and/or chromaticity in the radial direction means uniformity of such lightness and/or chromaticity in the circular direction. The variation of lightness and/or chromaticity in a radial direction and the uniformity of lightness and/or chromaticity in a circular direction are often observable more or less on the polished surface on the cut surface of the sintered spherical body, although the clear stripes as seen inside the unfired spherical body disappear in the sintered body.

In still another aspect, the spherical body made from the adjusted powder and then sintered in the HIP or GP, according to the invention, can be made as having substantially no inside pores between the nucleus and the surface of the spherical sintered body. This is because of the combination of the adjusted powder described herein, the method of the invention and a pressure-applied sintering process including HIP or GP.

BRIEF DESCRIPTION OF THE DRAWINGS

FIG. 7(b) is a schematic view showing an opening of the rotating cylinder of FIG. 7(a).

FIG. 9(a) is a schematic view of a ball media placed on a media holder having holes in the apparatus in FIG. 8.

FIG. 9(b) is a schematic view of the ball media through which hot air blows and dries the ball media.

FIG. 10 is a schematic view of the ball media with balls colliding with each other so that aggregate layers formed on the balls are pulverized into a fine powder and are blown by the hot air.

DETAIL DESCRIPTION OF THE INVENTION

The present inventors have found that, by adjusting a material powder into an adjusted powder having powder characteristics of an average particle size and a 90% particle size, as measured using a laser diffraction granulometer, falling within the above-described ranges and a BET specific surface area falling within the above-described range, spherical bodies formed by any of the above or later described granulation processes—which are more efficient than, for example, a die pressing process—suffer less non-uniform density or discontinuous boundaries which would otherwise result from biased distribution of powder particles. This considerably reduces a defective fraction in terms of defects caused by non-uniform shrinkage of sintered bodies, or in terms of deformation of, cracking in, or chipping of sintered bodies. The present invention can accelerate implementation of ceramic bearing balls for use under special working conditions, such as those for use in bearings of hard disk drives or semiconductor apparatus for computer use requiring high reliability.

A laser diffraction granulometer is well known in the art and is useful in the present invention. Briefly, a sample powder of interest is irradiated with a laser beam. A beam diffracted by the sample powder particles is detected by means of a photodetector. A scattering angle and an intensity of the diffracted beam are obtained from the data obtained by the photodetector. Powder characteristics such as particle size distribution including an average particle size (i.e., 50% particle size of a cumulative particle size distribution) and the 90% particle size can be obtained from the scattering angle and the intensity.

Figure 11:
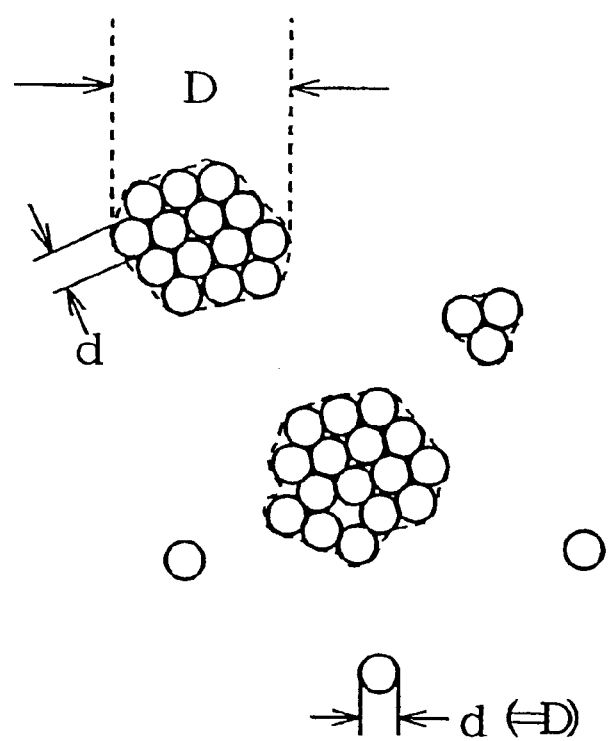
FIG. 11 is a schematic view of a secondary particle aggregate of solitary primary particles.
Figure 12:
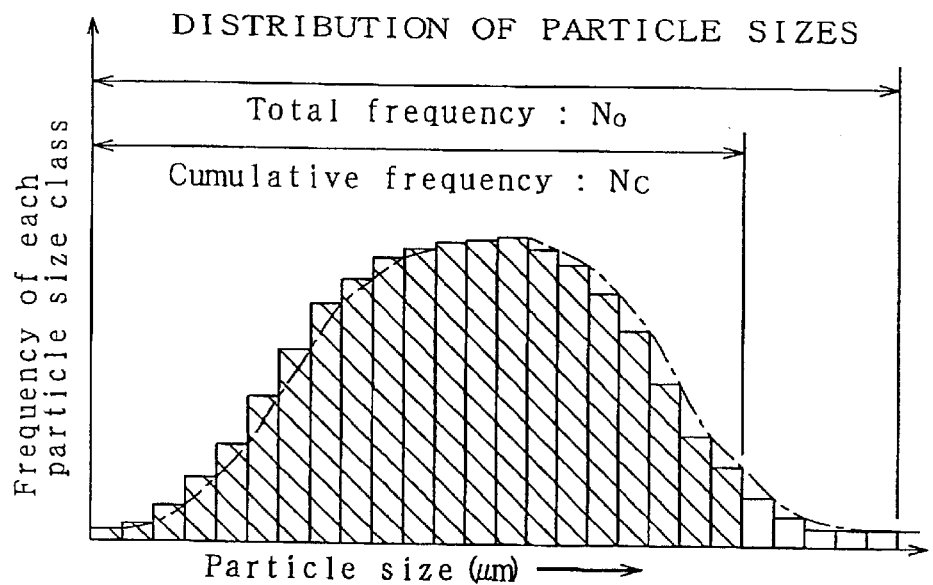
FIG. 12(a) shows particle size frequency as a function of particle size distribution, for defining cumulative frequency (Nc) and total number (No) of particles in a powder particle size distribution.
FIG. 12(b) shows a relative cumulative frequency of powder particle size as a function of powder particle size, for defining a 90% particle size and a 50% particle size (i.e., average particle size) of an adjusted powder.
Figure 12:
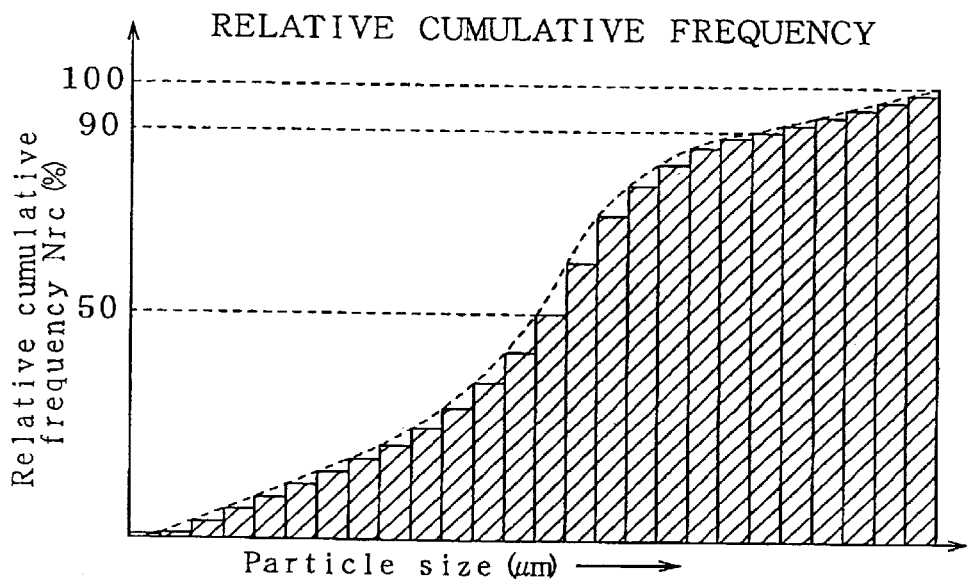

Particles of a material powder to be formed and sintered—which powder is normally composed of fine primary particles and sintering aid particles—often assume a form of secondary aggregate particles as shown schematically in FIG. 11, referring to a solitary primary particle size (d) and a secondary aggregate particle size (D). Various factors such as the influence of an added organic binder and/or static electricity are considered to cause the fine primary particles to aggregate to form the secondary aggregate particle comparatively large in size.

When the material powder is subjected to measurement by the laser diffraction granulometer, the secondary aggregate particle and the solitary primary particle do not result in much difference in the diffracting behavior of an incident laser beam. Accordingly, whether a measured particle size is of a solitary primary particle or of a secondary aggregate particle is not definitely known. That is, the thus-measured particle size reflects the secondary particle size (D) shown in FIG. 11. In this case, the solitary primary particle is also considered to be a secondary particle as defined in a broad sense. The average particle size and the 90% particle size computed from the measured particle sizes with the laser diffraction granulometer reflect an average particle size and a 90% particle size of secondary particles including solitary particles of the powder of interest.

A BET specific surface area is the surface area of particles per unit weight. This BET value is obtained from the amount of gas adsorbed by aggregates of particles. The gas molecules penetrate into the secondary particle to thereby cover the surfaces of constituent solitary primary particles. As a result, an obtained BET specific surface area reflects the specific surface area of primary particles of the powder; i.e., the average of primary-particle sizes (d) as shown in FIG. 11.

One of the best materials for the adjusted powder for use in the method of the present invention for manufacturing a large quantity of spherical sintered bodies as bearings may be silicon nitride ($Si_3N_4$), because the silicon nitride ceramic is light in weight, high in toughness (or strength) and high in hardness. A second best material for the adjusted powder for making spherical bodies for bearings may be zirconia, because the zirconia ceramic has a thermal expansion coefficient closer to metals constituting bearing parts that incorporate the spherical bodies, although it is heavier than silicon nitride ceramic. A third may be alumina, because it is hard and inexpensive. Other material candidates for the adjusted powder material are carbides such as TiC, WC and SiC, nitrides such as TiN and TaN and cermet, because these materials have some degree of electrical conductivity that prevents static electricity. Diamond or BN (like cubic boron nitride) can be a good candidate for the adjusted powder material, because they are hardest or second hardest among all materials. Other materials including other ceramic, metal, glass and/or a composite material, which require a firing or sintering process that follows the process for making spherical bodies, can be used as the adjusted powder in the method of the present invention.

In order to obtain sintered bodies of silicon nitride which have sufficiently high density and strength and a low fraction of defects by the method of the present invention, an important point is as follows. The powder material of interest is prepared and adjusted so as to have powder characteristics showing the average particle size or 90% particle size (as measured using the laser diffraction granulometer) as small as about 1/10 of that of conventional powder material that is normally obtained by means of a spray-drying process. Specifically, the adjusted powder according to the invention is adjusted from a powder material of interest, so as to have an average particle size of 0.1–2 μm and/or a 90% particle size of 0.7–3.5 μm, both of which reflect the secondary-particle size. The adjusted powder within these two ranges is less likely to form non-uniform aggregates as secondary particles, and facilitates making a density of particles uniformly distributed in the aggregates. As a result, spherical green bodies formed through a granulation process (i.e., growing granular green bodies by rotation of a nucleus) according to the invention, is less likely to suffer biased distribution of particles in the green body and less likely to cause defects such as pores or holes in the resultant sintered spherical bodies.

When the average particle size of the adjusted powder exceeds 2 μm and/or the 90% particle size exceeds 3.5 μm, the unfired spherical granular bodies become likely to suffer biased distribution of particles, or potentially cause non-uniform shrinkage of the body during firing or sintering, which, in turn, causes deformation, cracking, or chipping of the resultant sintered body. By contrast, the adjusted powder having an average particle size of less than 0.1 μm and/or a 90% particle size of less than 0.7 μm requires a considerably long preparation time (i.e., pulverization time), resulting in increased manufacturing cost due to low manufacturing capability. More preferably, the average particle size of the adjusted powder is from 0.3–1 μm, and the 90% particle size is from 0.7–2 μm for the adjusted powder.

When the BET specific surface area of the adjusted material powder is less than 5 $m^2/g$, the primary-particle size is excessively large, causing non-uniform sintering of the granular spherical body. As a result, the spherical sintered body thus obtained suffers defects with a deterioration in strength or toughness. By contrast, the material powder having a BET specific surface area in excess of 20 $m^2/g$ requires a considerably long preparation time (including pulverization time), resulting in increased manufacturing cost due to low manufacturing capability. More preferably, the BET specific surface area of the adjusted powder is from 5–13 $m^2/g$ and more preferably, from 5–10 $m^2/g$.

Known materials may be used as a sintering aid powder in the case of ceramic powder. Examples of such material include alumina, yttria and other rare-earth oxides, magnesia, spinel, zirconia, or silica. The sintering aid powder to be mixed with ceramic powder, e.g., silicon nitride powder, may be in an amount of 1–10 parts by weight per 100 parts by weight of silicon nitride. When the above amount of sintering aid powder added to the silicon nitride is less than 1 part by weight, the spherical sintered body is less likely to increase in density, potentially resulting in poor strength of the spherical silicon nitride sintered body, and may not be suitable in use for bearings. When the above amount of the sintering aid powder is in excess of 10 parts by weight, silicon nitride particles contained in the sintered body become coarser, again potentially resulting in poor strength of the sintered body. However, other powder material to be adjusted may require a different range of a sintering aid amount, depending on its material characteristics and conditions in actual use.

Processing conditions for the method of making spherical granular bodies by rotation or tumbling of the nucleus according to the invention may require that the spherical granular body yet unfired assumes a relative density of at least 61%, when water is selected as the solvent. The spherical body having a relative density of less than 61% becomes difficult for handling, due to poor strength of the granular body and the yield of the resultant sintered spherical bodies of ceramic, specifically, of silicon nitride, is impaired accordingly. The adjusted powder according to the invention forms a granular body having a relative density of more than 61% when it is made by the method of the present invention.

Spherical granular bodies are preferably sintered under the HIP or GP sintering process. The GP (gas-pressure) sintering process may employ a nitrogen gas atmosphere, a gas pressure of about 2–100 atm, and a firing temperature of about 1500–1850° C. in sintering the spherical bodies of silicon nitride ceramic. The HIP (hot isostatic press) sintering process may employ a nitrogen gas atmosphere, a pressure of about 100–2000 atm, and a firing temperature of 1500–1850° C. in sintering the same.

PREFERRED EMBODIMENTS OF THE INVENTION

An embodiment of the present invention will next be described with greater attention to the method of making spherical sintered bodies of silicon nitride ceramic, with reference to the accompanying drawings.

Figure 1:
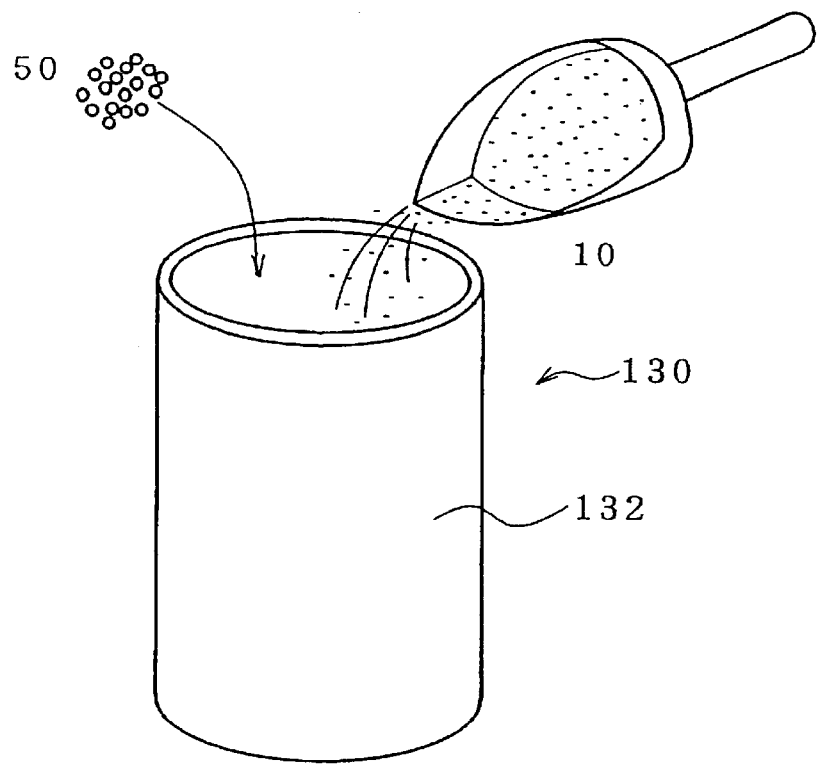
FIG. 1 is a schematic view showing a cylindrical container that rotates into which nuclei and/or adjusted powder are poured.
Figure 2:
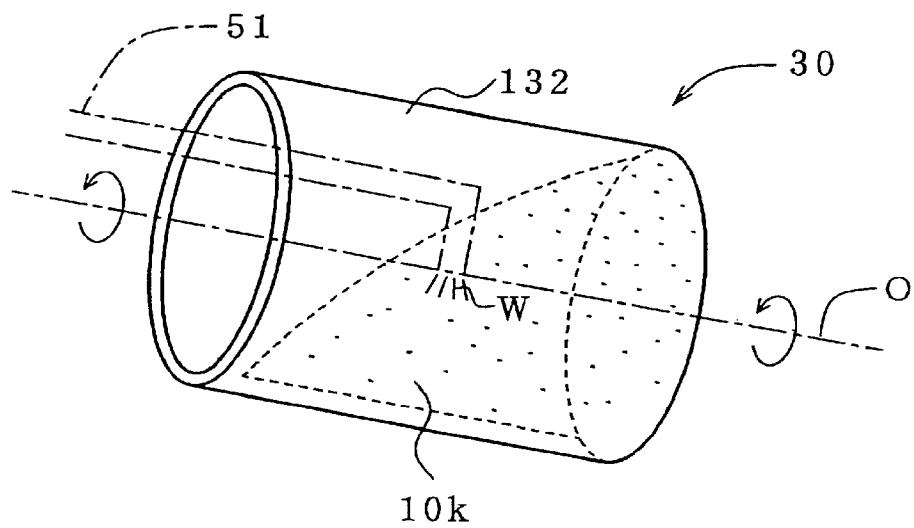
FIG. 2 is a schematic view showing the cylindrical container in rotation, incorporating the nuclei with addition of the adjusted powder and a solvent.
Figure 3:
FIGS. 3(a), 3(b), 3(c), 3(d) and 3(e) show a variety of shapes of the nuclei that can be rotated in the method of the invention.
Figure 3:
Figure 3:
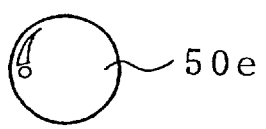

FIG. 1 schematically shows that a powder of nuclei (50) and an adjusted powder (10) according to the invention are being poured inside a container (132) that is a part of a spherical granular bodies-growing device 30 as in FIG. 2, in which the container (132) rotates along an axis (O) of the rotating rotor or rather rotationally tumbling the nuclei 50 along a layer of the adjusted powder (10k) distributed inside the container (132).

In this process, the nuclei 50 may be first tumbled or rotated by the rotating container 132 and then the adjusted powder and a solvent (w) may be poured in through a tube 51 controlling an additional amount of the adjusted powder and solvent.

A particle shape of the nuclei 50 may take a different one such as shown by reference numerals (50a), (50b), (50c), (50d) and 50(e) in FIGS. 3(a), 3(b), 3(c), 3(d) and 3(e), respectively.

A particle size of the nucleus is selected from a size of from 50–500 μm which is far larger or at least ten times larger than the particle size of the adjusted powder, and which is preferably 20–200 times larger than the average particle size of the adjusted powder that will be described below. However, the particle size of the nucleus is selected as not exceeding ½ of the diameter of the spherical granular body in most cases, because the spherical sintered body is subjected to surface grinding. A 100–300 μm particle size of the nucleus performs best with the adjusted powder of the invention.

The material of the nucleus can be selected from various kinds of materials such as ceramic, glass, metal and resins such as wax, as long as a the nucleus material does not adversely affect the unfired or fired spherical body. However, it is preferable to use nuclei having the same material as the adjusted powder material that is formed into the granular body.

When the wax ball is used as the nucleus, the resultant spherical sintered body may have a hollow inside the body or no nucleus substance remaining inside the ball because the wax ball is lost during firing and the granular body shrinks during sintering. In this case, the spherical sintered body made according to the invention is defined as having a nucleus even if the nucleus is not observed. This may be identified by the difference of lightness and/or chromaticity observed on the cross section between the center and the remainder surrounding the center.

Figure 4:
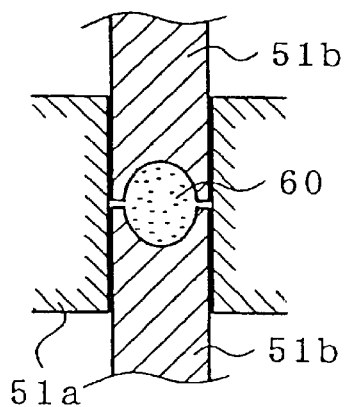
FIGS. 4(a), 4(b), 4(c), 4(d) and 4(e) schematically illustrate various nuclei that can be used in the method of the invention and which can be made by a variety of methods.
Figure 4:
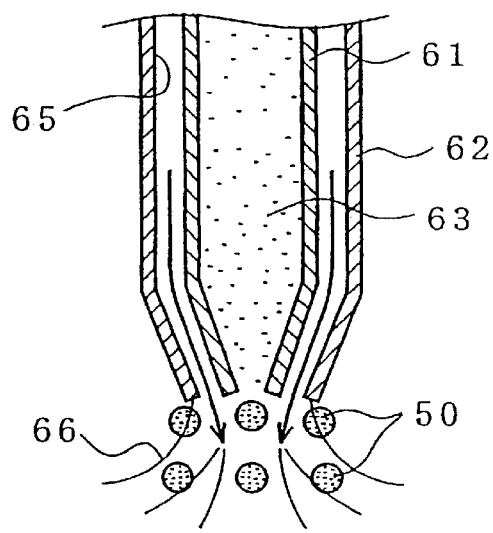
Figure 4:
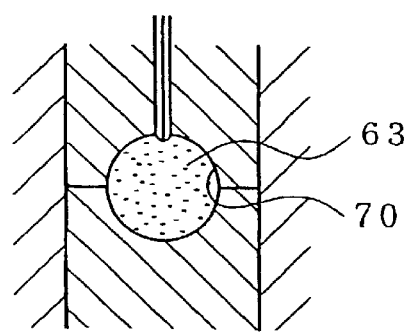
Figure 4:
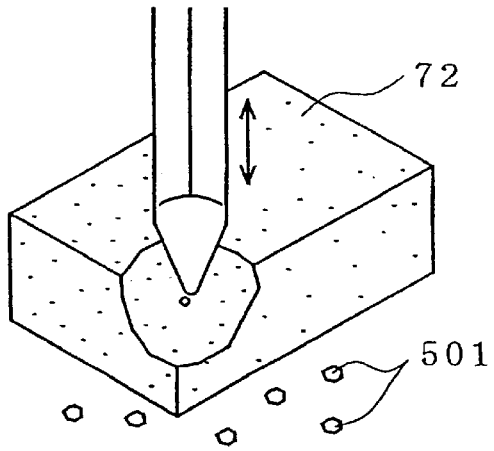
Figure 4:
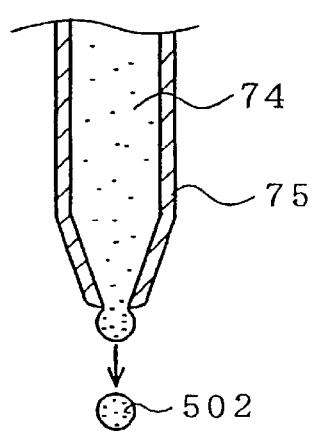
Figure 5:
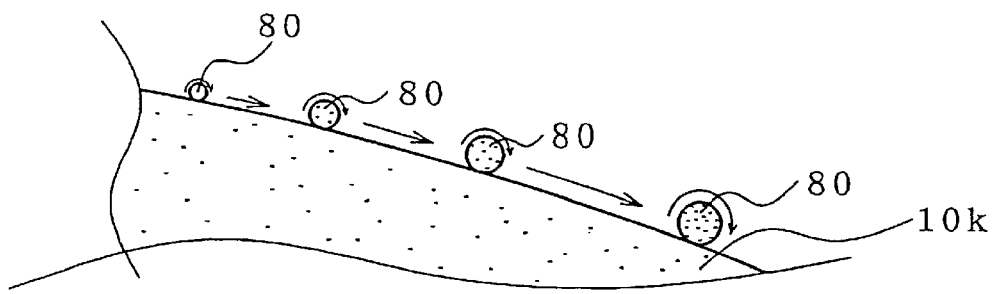
FIG. 5(a) schematically shows a rotating nucleus and a granular body rotationally growing in size by adhering powder particles around the nucleus.
FIG. 5(b) schematically illustrates a granular body growing in size by adding layers of aggregate particles.
FIG. 5(c) schematically illustrates a powder particle being forced into particles layered on a granular body surface.
FIG. 5(d) schematically illustrates a rotating deformed granular body made without a nucleus.
FIG. 5(e) schematically illustrates arrayed particles accompanied with filtration of a solvent (w).
Figure 5:
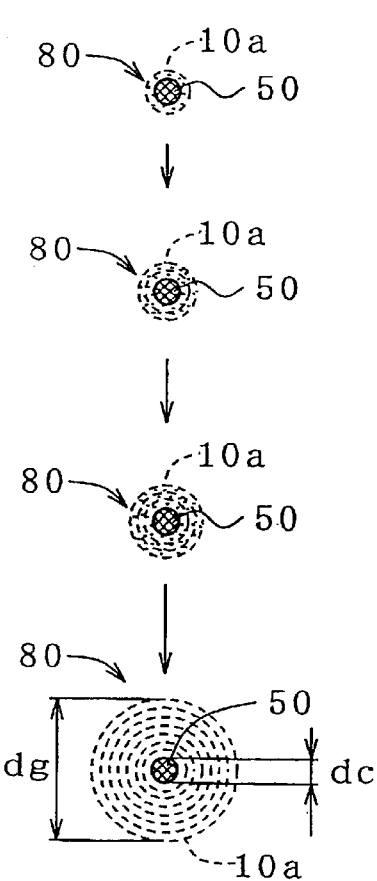
Figure 5:
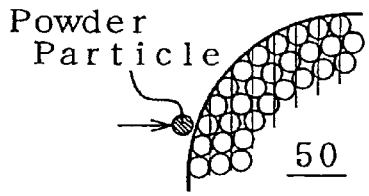
Figure 5:
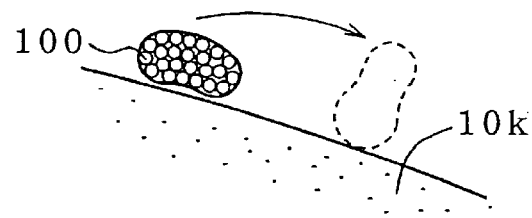
Figure 5:
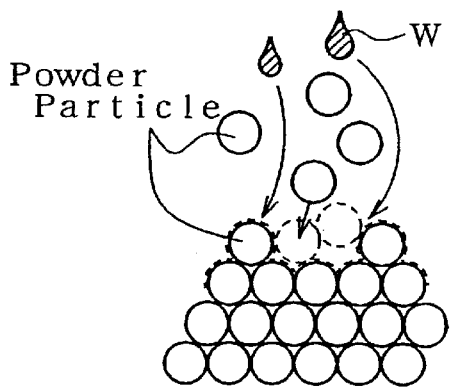
Figure 6:
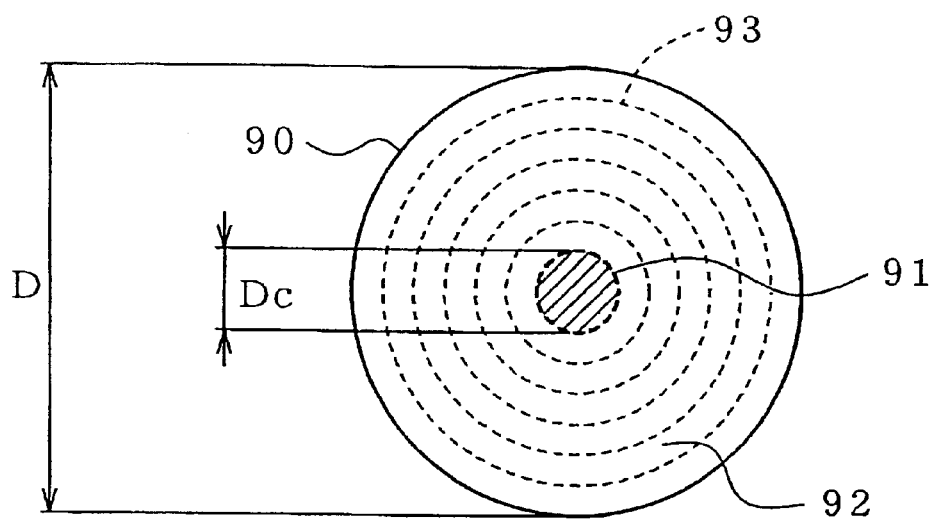
FIG. 6 is a schematic view showing a cross section of a spherical sintered body having a nucleus in its center.

The nuclei to be used in the method of the invention for forming granular green bodies around the nuclei by rotation can be made in various ways. One way may be, as shown in FIG. 4(a), is to form a nucleus (60) by pressing a powder with a die (51a) and press punches(51b, 51b). Another way is to select large size particles of aggregates by classifying conventional spray-dried particles of aggregates into the nucleus sizes. A third way, as shown in FIG. 4(b), is to blow a fused compound (63) contained in a first nozzle (61) by jetting gas or liquid from a second coaxial nozzle (62) formed circularly on the first nozzle (61) to form solid nucleus particles (50). A fourth way is to form nucleus particles by leading the fused compound (63) into a cavity (70), as shown in FIG. 4(c). A fifth way is to crush a formed granular body (72) unfired or sintered, and to classify the crushed powder (501) as shown in FIG. 4(d). A sixth way is to form a spherical nucleus droplet (502) by dropping a resin material (74) from a nozzle (75) as shown in FIG. 4(e).

Figure 8:
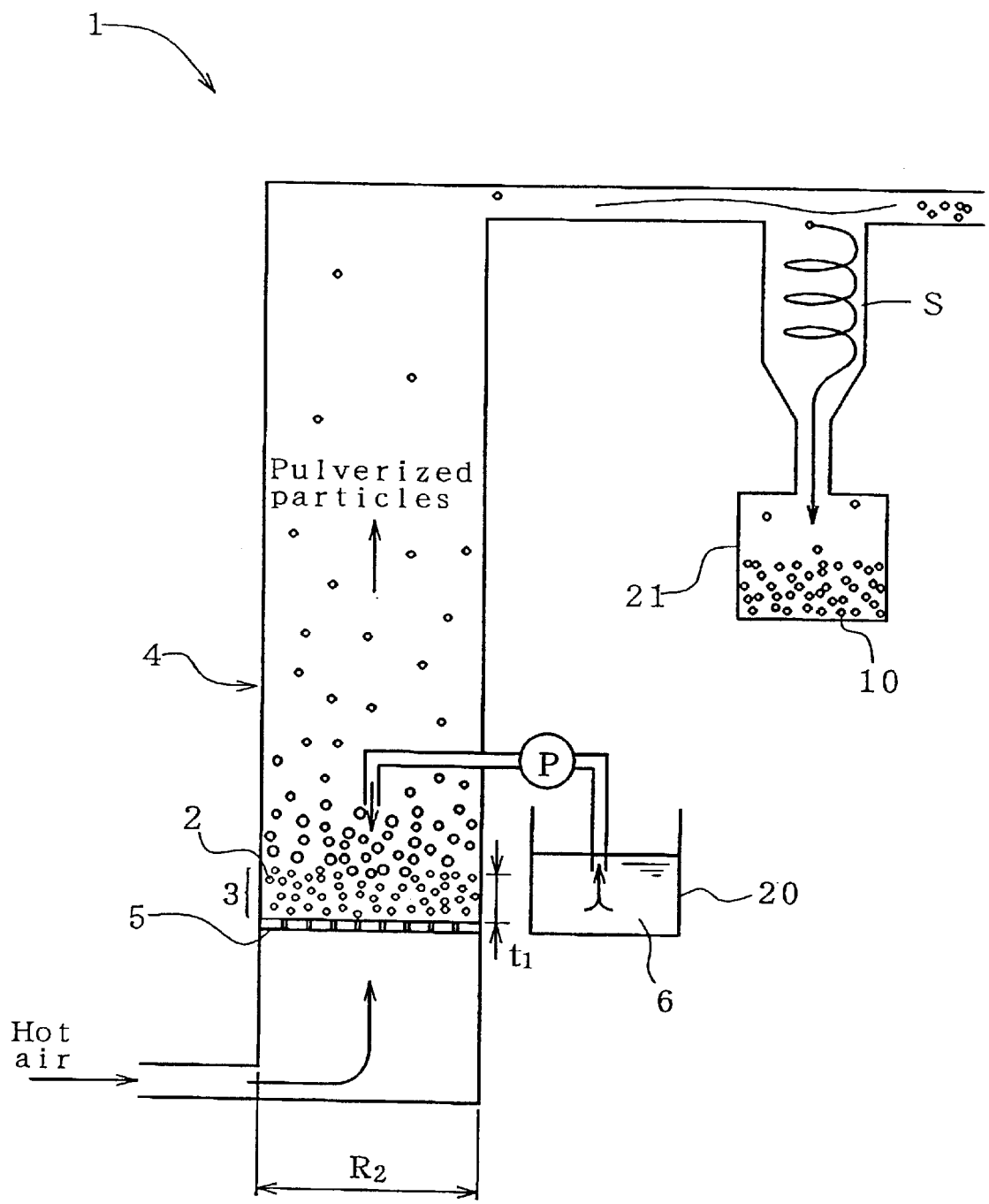
FIG. 8 is a schematic longitudinal sectional view showing an apparatus for making an adjusted powder for use in the method of present invention for making spherical bodies.

The adjusted powder to be utilized in the method of the present invention is prepared by the following method and apparatus which will be next explained and described by referring to FIG. 8. A hot air passage (1) has a vertically disposed hot air duct (4). The hot air duct (4) includes a holder plate (5) having air passage holes, supported at an intermediate position of the hot air duct (4). A drying ball media 2 composed of alumina ceramic balls is gathered forming a ball media layer (3) on the holder (2) having the passages shown in FIG. 9(a). As schematically illustrated in FIG. 8 and FIG. 9(b), hot air is blown in from a lower position of the duct (4) through the passage of the holder plate (5), drying and moving the ceramic balls colliding with each other. A slurry (6) comprising the powder material of interest and a solvent is fed from a slurry tank (20) through a flow control pump (P) to the drying ball media (2), and at the same time, the hot air is caused to flow through the drying media 2 while agitating the drying media 2. The slurry poured on the ball media layer (3) is dried forming a layer of aggregates of the powder materials. FIG. 10 schematically illustrates that the layer (6) of aggregates (PL) is formed on the ball media (2) and the layer of aggregate (PL) formed on the balls is crushed or rather pulverized into a fine powder (9) by the balls rubbing and/or colliding each other. The fine powder (9) of the thus pulverized particles is removed from the ball media by the hot air blowing through the ball media (2) as shown in FIG. 10. As schematically illustrated in FIG. 8, the fine powder of the pulverized particles is carried with the hot air to some distance, and classified by a cyclone separator (S) into an air adjusted powder 10 having the desired powder characteristics which is gathered in a reservoir 21. The powder characteristics can be modified by various factors such as the flow rate and temperature of the hot air, the amount of the slurry to be fed and the amount of the ball media (2). In the case of a ceramic powder, the adjusted powder (10) yielding powder characteristics having an average particle size of from 0.1–2 μm and a 90% particle size of from 0.7–3.5 μm, both as measured using a laser diffraction granulometer, as well as a BET specific surface area of 5–20 $m^2$/g is most preferred.

The flow of hot air causes repeated agitation and falling of the drying ball media 2. Thus, the drying media 2 collide and rub against one another, whereby the powder aggregate layers PL are broken (pulverized) into fine particles (9) as shown in FIG. 10. Some of the fine particles (9) assume the form of solitary primary particles, but most of the material particles assume the form of the secondary aggregate particle that is the aggregation of primary particles. The fine powder particles (9) having a particle size not greater than a certain value are conveyed downstream by the hot air (FIG. 8). The fine particles (9) having a particle size greater than a certain value are not blown by the hot air, but again fall onto the drying media 2, thereby undergoing further pulverization effected by the drying media 2.

Preferably, the drying media 2 has a substantially uniform diameter so as to leave an appropriate space therebetween, whereby the motion of the drying media 2 is accelerated during the flow of the hot air.

A thickness ti of the drying media layer 3 is determined such that the drying media 2 moves appropriately according to the velocity of hot air. If the thickness t1 is excessively large, the drying media 2 will have difficulty in moving, causing poor impact force. If the thickness t1 is excessively small, the drying media 2 will collide less frequently, resulting in impaired processing efficiency.

The temperature of the hot air is determined such that the slurry 6 is dried sufficiently and the material powder 10 does not suffer any problem, such as thermal deterioration. Hot air having a temperature lower than 100° C. fails to sufficiently dry the fed slurry 6.

Now, another embodiment of the method of making spherical bodies from powder by rotation of nuclei, will be explained with referring to FIGS. 7(a) and 7(b). A tumbling granulation apparatus (30) includes a relatively flat, cylindrical granulation container (32), which is open at a top end, and a rotating shaft 31, one end of which is connected substantially perpendicularly to a central portion of the bottom of the granulation container 32. The granulation container 32 is rotated by a rotational drive unit through the rotating shaft 31.

The adjusted powder 10 and water are charged (e.g., by spraying) into the granulation container 32 rotating at a constant peripheral speed, wherein nuclei are rotated or rotationally tumbled. As shown in FIG. 7(b), the adjusted powder 10 accumulated around the nucleus rolls down on an inclined powder layer formed within the granulation container 32 to thereby agglomerate into a spherical granular body 80 having the nucleus therein. operating conditions of the tumbling granulation apparatus 30 are adjusted such that the formed spherical granular body 80 has a diameter of not greater than 5 mm, for the bearing balls not exceeding 4 mm diameter, and a relative density of at least 61%. Specifically, the rotational speed of the granulation container 32 is adjusted to 10–200 rpm. The water feed rate is adjusted such that the final spherical granular green body 80 has a water content of from 10–20 wt %.

It is preferable that the thus-obtained spherical granular bodies 80 are sintered through gas-pressure sintering or hot isostatic-press sintering, in the case that the adjusted powder is ceramic such as silicon nitride. The resultant sintered bodies undergo polishing for adjustment of, for example, diameter, sphericity, or surface roughness, thereby yielding ceramic bearing balls of, e.g., silicon nitride. Notably, when the spherical bodies 80 are sintered in bulk, burrs may be formed thereon due to fusion. However, these burrs are removed by polishing.

EXAMPLES

In order to confirm the effects of the present invention, the following experiments were conducted, however, the present invention should not be construed as being limited thereto.

Silicon nitride powder (average particle size: 0.3–4.0 µm; BET specific surface area: 4–13 m²/g; 94 parts by weight), alumina powder (average particle size: 0.4 µm; BET specific surface area: 10 m²/g; 3 parts by weight) serving as sintering aid, yttria powder (average particle size: 1.5 µm; BET specific surface area: 10 m²/g; 3 parts by weight), and pure water (50 parts by weight) serving as solvent were mixed to prepare various kinds of powder material slurries to be adjusted. The average particle size and the 90% particle size were measured using of a laser diffraction granulometer (model LA-500, product of Horiba, Ltd.). The BET specific surface area was measured using a BET-specific-area measuring device (MULTISOPE 12 made by Yuasa Ionix Corp.).

Various kinds of adjusted powders (P) were made from the above slurries using the apparatus of FIG. 8. Specifically, alumina balls having a diameter of 2 mm were used as drying media 2, and the apparatus was set to the following conditions:

Inner diameter R2 of hot air duct 4 equipped with drying-media holder 5: Approx. 200 mm;
Depth of layer of drying media 2: approx. 150 mm;
Temperature of hot air: 160° C.; and
Velocity of hot air: 3 m/s.

These various kinds of adjusted powders were measured for average particle size, 90% particle size, and BET specific surface area in a manner similar to that described above. As a result, the following powder characteristics of the adjusted powder were obtained: the average particle size was 0.3–2.0 µm; the 90% particle size was 0.7–3.5 µm; and the BET specific surface area was 5–13 m²/g (Sample Nos. 1–6).

Various kinds of comparative powder materials serving as comparative examples were prepared in the following manner. Silicon nitride powder (average particle size: 1.0 µm; BET specific surface area: 10 m²/g; 94 parts by weight), alumina powder (average particle size: 0.4 µm; BET specific surface area: 10 m²/g; 3 parts by weight) serving as a sintering aid, yttria powder (average particle size: 1.5 µm; BET specific surface area: 10 m²/g; 3 parts by weight), water (40 parts by weight) serving as a solvent, and an organic binder (6 parts by weight) were mixed to prepare a slurry. The slurry was spray-dried, yielding two kinds of material powder having an average particle size of 70 and 100 µm, a 90% particle size of 150 and 200 µm, and a specific surface area of about 11 m²/g (Sample Nos. 8 and 9). The spray-dried powder of Sample No. 8 was subjected to degreasing of the organic binder. The resultant powder was ball-milled, yielding material powder having a 90% particle size of 70 µm (Sample No. 7). Further, another slurry that did not contain the organic binder was placed in a container and then dried in a drier at 200° C. The dried substance was pulverized in a mortar, yielding material powder having an average particle size of 50 µm, a 90% particle size of 200 µm, and a specific surface area of 11 m²/g (sample No. 10).

Figure 7:
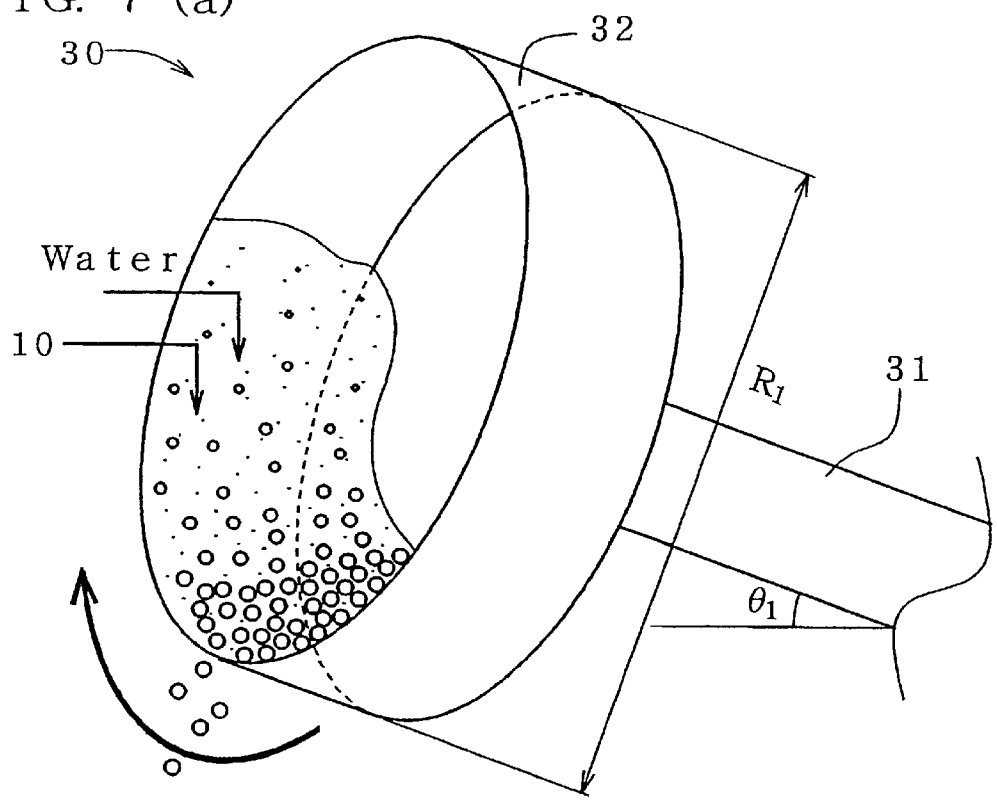
FIG. 7 (a) is a schematic perspective view showing a rotating cylinder rotationally growing granular green bodies inside the rotating cylinder.
Figure 7:
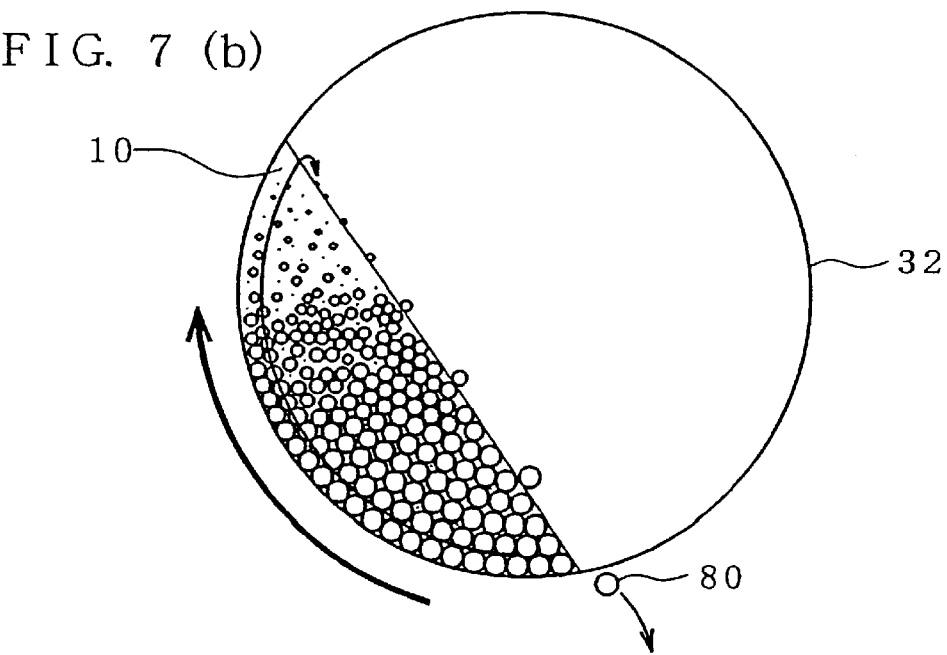

The thus-prepared various kinds of powder materials (including the adjusted powder and comparative powder) were formed into spherical granular bodies each having a nucleus in the center using the tumbling granulation apparatus shown in FIG. 7.

The conditions of tumbling granulation were as follows:
Inner diameter R1 of granulation container 32: 400 mm;
Angle θ1 of inclination of rotating shaft 31: 15°;
Rotational speed: 30 rpm (rotational peripheral speed: 37.7 m/min); and
Water content of final spherical green bodies effected as a result of supply of water: 12 wt %.

The relative density of the spherical green (i.e., unfired) body was obtained in the following manner. The volume of the spherical green body was obtained from the diameter of the spherical body while the spherical body was considered as a sphere. The weight of the spherical body was divided by the obtained volume. The spherical green bodies were subjected under a gas-pressure sintering process (pressure: 75 atm; temperature: 1750° C.; atmospheric gas: nitrogen) or a hot isostatic pressing-sintering process, or a HIP process, (pressure: 1000 atm; temperature: 1750° C.; atmospheric gas: nitrogen), to yield spherical sintered bodies of silicon nitride. The condition of the cross sections of the spherical sintered bodies of silicon nitride was observed using an optical microscope, and the sintered bodies were evaluated according to the following criteria: good: the cross section is free of any defect; poor: the cross section has a defect. Further, the spherical sintered bodies were polished so as to attain a target sphericity of 0.08 µm, a surface roughness (average roughness along centerline) of 0.012 µm, and a diameter variation of 0.08 µm, thereby yielding ceramic bearing balls. The ceramic balls were tested to see whether they were suitable for use as bearings. The results are shown in Table 1.

uniform density in the sintered body and incurring substantially no pores in the sintered body.

The sintered bodies of the comparative examples were found to suffer many internal defects, such as non-uniform density conceivably caused by biased distribution of powder particles and voids caused by discontinuous boundaries. Therefore, they could not be polished to a target accuracy and thus were not suitable as bearing balls. By contrast, the sintered bodies of the examples of the invention were free of any defect and could be polished into bearing balls. These bearing balls raised no problem when used in actual bearings.

This invention provides a method for manufacturing spherical sintered bodies of silicon nitride capable of providing small-diameter balls at high efficiency with formation of fewer defects. This enables application, on a large scale, of the spherical sintered bodies of silicon nitride, for example, to bearings of hard disk drives for use in computers, in which ceramic has not yet found full utility.

A feature of the invention is the use of an adjusted powder (pre-adjusted in its powder characteristics) in a method for

TABLE 1

| | Silicon nitride powder | | various powder materials | | | | | |
|---|---|---|---|---|---|---|---|---|
| Sample No. | Average particle size (µm) | Specific surface area (m²/g) | Average particle size (µm) | 90% particle size (µm) | Specific surface area (m²/g) | Sintering process | Relative density of spherical green body (%) | Judgment on sintered body |
| 1 | 0.6 | 13 | 0.6 | 1.1 | 13 | H | 65 | Good |
| 2 | 0.8 | 10 | 0.7 | 1.2 | 11 | G | 65 | Good |
| 3 | 1.0 | 10 | 0.9 | 1.5 | 10 | H | 63 | Good |
| 4 | 0.3 | 12 | 0.3 | 0.7 | 12 | G | 65 | Good |
| 5 | 2.5 | 7 | 1.5 | 3.5 | 7 | H | 62 | Good |
| 6 | 4.0 | 4 | 2.0 | 3.0 | 5 | G | 61 | Good |
| 7* | 1.0 | 10 | 5.0 | 70 | 11 | H | 60 | Poor |
| 8* (spray dried) | 1.0 | 10 | 70 | 150 | 11 | H | 55 | Poor |
| 9* (spray dried) | 0.8 | 11 | 100 | 200 | 11 | H | 50 | Poor |
| 10* | 0.8 | 10 | 50 | 200 | 11 | H | 61 | Poor |

*Comparative samples
H: HIP process
G: Gas-pressure sintering process

Figure 13:
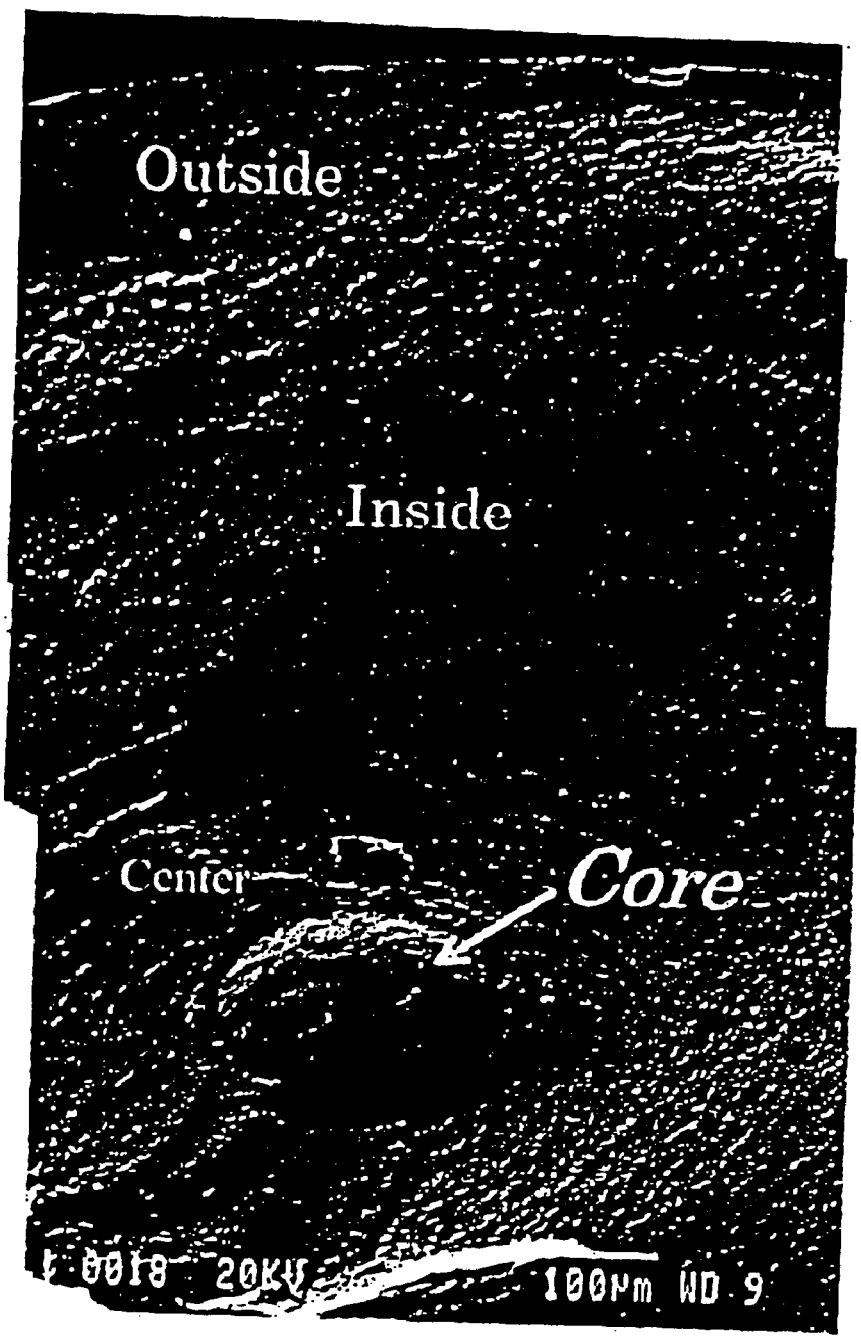
FIG. 13 is an enlarged SEM photo showing a section of a spherical granular green body made by the method of the invention, showing a nucleus or core inside the spherical body.
Figure 14:
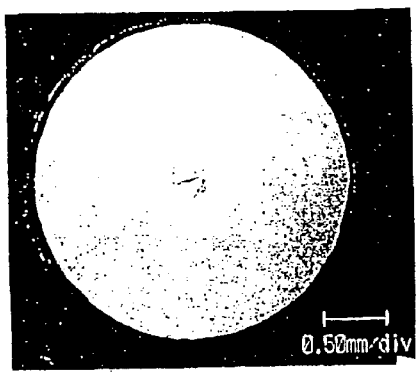
FIG. 14(a) is an enlarged photo showing a cross section of a spherical body fired at 1400° C. made by the method according to the invention, showing a nucleus in the center of the body.
FIG. 14(b) is a further enlarged photo of FIG. 14(a), showing the nucleus and a circular arc inside the body.
FIG. 14(c) is a still further enlarged photo of FIG. 14(b), showing the nucleus having a density different from a uniform density of the remainder of the spherical body.
FIG. 14(d) is a still further enlarged photo of FIG. 14(b), showing the circular arc having a density different from the uniform density of the remainder of the spherical body.
Figure 14:
Figure 14:
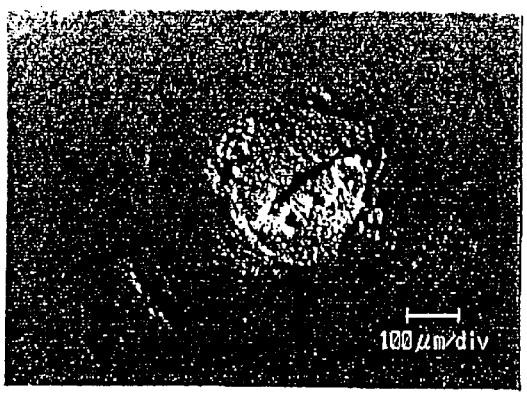
Figure 14:
Figure 15:
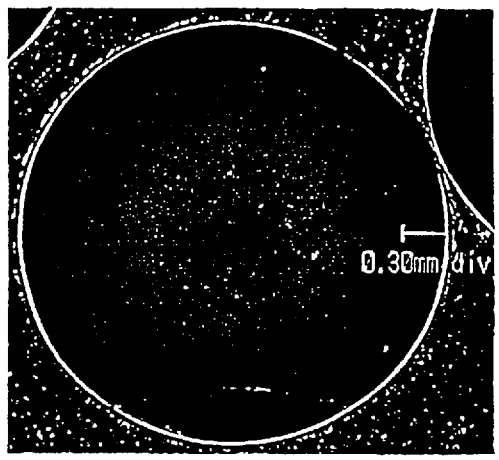
FIGS. 15(a), 15(b) and 15(c) are enlarged photos taken on cross sections of three different spherical sintered bodies of a silicon nitride ceramic, according to the invention, each showing a lightness and/or cromaticity varying in a radial direction but not varying in a circular direction.
Figure 15:
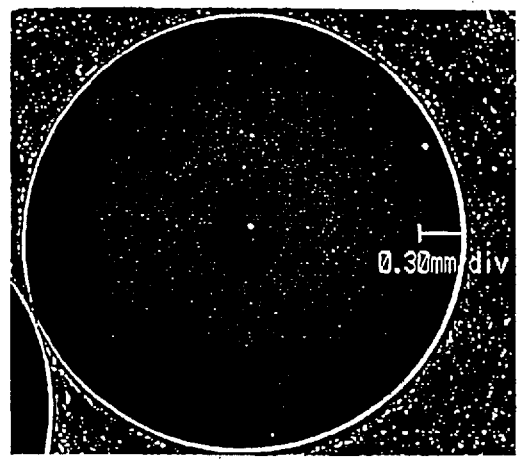
Figure 15:
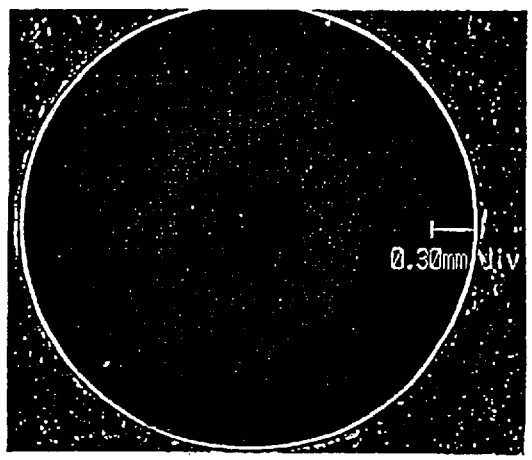

FIG. 13 shows an enlarged photo taken by a SEM on a cross section of a spherical granular green body made according to the method of the invention, showing a core (i.e., nucleus) in the center of the body. This green body had a 71% relative density. FIGS. 14(a)–14(d) show enlarged photos showing a cross section of the spherical body of silicon nitride, made according to the method of the invention, but fired at 1400° C. in a nitrogen atmosphere. The relative density of this pre-fired spherical body was about 74%. FIG. 15(a) shows an enlarged photo taken on a cross section of a spherical sintered body of silicon nitride sintered at 1750° C. in a nitrogen atmosphere under HIP sintering, made according to the method of the invention. FIG. 15(b) and FIG. 15(c) show enlarged photos taken on cross sections spherical sintered bodies of silicon nitride sintered at 1750° C. in a nitrogen atmosphere under GP sintering, made according to the invention.

The relative density of any of the spherical green bodies having a relative density of more than 60%, made according to the method of the invention using the adjusted powder of silicone nitride disclosed herein, becomes more than 99.9%, or substantially 100% under HIP or GP sintering, showing forming and growing spherical granular green bodies during rotation or rotational tumbling of nuclei.

The resulting spherical green bodies formed by the method of the invention have a high relative density and become spherical sintered bodies having a high density when subjected to sintering under a HIP or GP sintering process. Use of the adjusted powder enables formation of spherical sintered bodies having fewer defects as compared to use of a powder obtained by a conventional spray-drawing granulation process.

While the invention has been described in detail and with reference to specific embodiments thereof, it will be apparent to one skilled in the art that various changes and modifications can be made therein without departing from the spirit and scope thereof.

This application is based on Japanese Patent Application No. Hei. 10-290798, filed on Oct. 13, 1998, and is incorporated herein by reference.

What is claimed is:

1. A method of making spherical bodies from powder, which comprises:
   (1) preparing an adjusted powder having an average particle size of 0.1–2 µm, a 90% cumulative relative frequency in powder particle size distribution of from 0.7–3.5 µm and a BET specific surface area of from 5–20 m²/g;

(2) preparing nuclei having a particle size larger than that of the adjusted powder;

(3) rotating the nuclei; and (4) adding the adjusted powder and a solvent to the rotating nuclei so that particles of the adjusted powder accumulate on the nuclei to form granular bodies.

2. The method of making spherical bodies as claimed in claim 1, wherein the particle size of the nuclei is 1/100–1/2 that of said granular body.

3. The method of making spherical bodies as claimed in claim 1, wherein the particle size of the nuclei is from 20 times to 200 times larger than the average particle size of the adjusted powder.

4. The method of making spherical bodies as claimed in claim 1, wherein the particle size of the nuclei is from 50–500 µm.

5. The method of making spherical bodies as claimed in claim 1, wherein the particle size of the nuclei is from 100–300 µm.

6. The method of making spherical bodies from powder as claimed in claim 1, wherein the adjusted powder comprises a ceramic powder.

7. The method of making spherical bodies as claimed in claim 6, wherein said ceramic powder comprises $Si_3N_4$.

8. The method of making spherical bodies as claimed in claim 7, wherein said ceramic powder further comprises $Y_2O_3$ and/or MgO as a sintering aid for $Si_3N_4$.

9. The method of making spherical bodies as claimed in claim 7, wherein said ceramic powder further comprises $Al_2O_3$.

10. The method of making spherical bodies as claimed in claim 1, wherein said step of preparing an adjusted powder comprises:

mixing at least an inorganic powder and a sintering aid powder to form a uniformly mixed powder having an average particle size of 0.1–2 µm, a 90% cumulative relative frequency in powder particle size distribution of from 0.7–3.5 µm, and a BET specific surface area of from 5–20 m²/g.

11. The method of making spherical bodies as claimed in claim 1, wherein said step of preparing an adjusted powder comprises:

(1) forming a slurry by mixing at least a ceramic powder, a sintering aid powder and a solvent;

(2) drying the slurry into agglomerates; and (3) pulverizing the agglomerate into a fine powder having an average particle size of 0.1–2 µm, a 90% cumulative relative frequency in powder particle size distribution of from 0.7–3.5 µm, and a BET specific surface area of from 5–20 m²/g.

12. The method of making spherical bodies as claimed in claim 1, which further comprises:

(1) firing said granular bodies to thereby produce sintered spherical bodies; and (2) grinding surfaces of the sintered spherical bodies to produce finished spherical bodies.

13. The method of making spherical bodies as claimed in claim 1, wherein the average particle size of the adjusted powder and the cumulative particle size distribution of the adjusted powder are determined using a laser diffraction granulometer.

14. The method of making spherical bodies as claimed in claim 1, which further comprises subjecting said granular bodies to a gas pressure sintering process or a hot isostatic pressing process to thereby form spherical sintered bodies of high density.

15. The method of making spherical bodies as claimed in claim 13, wherein said high density is a relative density of more than 99%.

16. The method of making spherical bodies as claimed in claim 1, wherein said granular body that is unsintered has a relative density of at least 61%.

17. The method of making spherical bodies as claimed in claim 11, wherein the solvent comprises water.

18. A method for manufacturing spherical sintered bodies of silicon nitride, which comprises:

preparing a material powder which predominantly comprises silicon nitride powder and a predetermined amount of a sintering aid powder and has an average particle size of from 0.3–2 µm and a 90% cumulative relative frequency in powder particle size distribution of from 0.7–3.5 µm, both as measured using a laser diffraction granulometer, and a BET specific surface area of 5–13 m²/g;

forming the material powder into spherical bodies by rotating nuclei so that the material powder accumulates on the nuclei; and sintering the spherical bodies to obtain spherical sintered bodies of silicon nitride.

19. The method of making spherical bodies as claimed in claim 1, wherein each of said granular bodies contains one of said nuclei therein.

20. A method of making spherical bodies from powder, which comprises (1) preparing an adjusted powder so as to have at least one powder characteristic selected from the group consisting of an average particle size, a powder particle size distribution and a BET specific surface area;

(2) preparing nuclei having a particle size larger than that of the adjusted powder;

(3) rotating the nuclei; and (4) adding the adjusted powder and a solvent to the rotating nuclei so that particles of the adjusted powder accumulate on the nuclei to form granular bodies, wherein said step of preparing an adjusted powder comprises:

(5) preparing a slurry by uniformly mixing an inorganic powder, an inorganic sintering aid powder and a solvent;

(6) blowing hot air through a media comprising inorganic and/or organic balls so that the balls of the media are heated and vibrate or collide with each other;

(7) pouring the slurry onto the media so that the solvent in the slurry vaporizes to thereby form a layer of aggregates on the surface of the media;

(8) crushing the layer of aggregates with the balls of the media colliding with each other to form a pulverized powder from the aggregates;

(9) drying and blowing the pulverized powder from the media with the hot air flowing through the media; and

(10) classifying or sorting the pulverized powder by gravity while flowing so as to obtain an adjusted powder having said at least one powder characteristic.

21. The method of making spherical bodies from powder as claimed in claim 20, comprises preparing an adjusted powder having an average particle size of 0.1–2 µm, a 90% cumulative relative frequency in powder particle size distribution of from 0.7–3.5 µm and a BET specific surface area of from 5–20 m²/g.

\* \* \* \* \*